United States Patent
Cravens

(10) Patent No.: US 11,563,217 B2
(45) Date of Patent: *Jan. 24, 2023

(54) EXOTHERMICALLY RESPONSIVE CATHODES AND METHODS OF PRODUCTION THEREOF

(71) Applicant: IH IP Holdings Limited, St. Helier (JE)

(72) Inventor: Dennis Cravens, Cloudcroft, NM (US)

(73) Assignee: IH IP Holdings Limited, St. Helier (JE)

( * ) Notice: Subject to any disclaimer, the term of this patent is extended or adjusted under 35 U.S.C. 154(b) by 76 days.

This patent is subject to a terminal disclaimer.

(21) Appl. No.: 16/787,491

(22) Filed: Feb. 11, 2020

(65) Prior Publication Data

US 2020/0321624 A1 Oct. 8, 2020

Related U.S. Application Data

(63) Continuation of application No. 16/361,790, filed on Mar. 22, 2019, now Pat. No. 10,559,831.

(51) Int. Cl.
*H01M 4/88* (2006.01)
*C22C 5/04* (2006.01)
*C22F 1/14* (2006.01)

(52) U.S. Cl.
CPC ............ *H01M 4/8875* (2013.01); *C22C 5/04* (2013.01); *C22F 1/14* (2013.01)

(58) Field of Classification Search
CPC ........... C22F 1/14; C22C 5/04; H01M 4/8875
See application file for complete search history.

(56) References Cited

U.S. PATENT DOCUMENTS 10,559,831 B1 * 2/2020 Cravens ............... H01M 4/383
2005/0247379 A1 11/2005 Klein et al.

OTHER PUBLICATIONS

USPTO, non-Final Office Action in U.S. Appl. No. 16/361,790 dated Aug. 15, 2019.

* cited by examiner

*Primary Examiner* — Jessee R Roe
(74) *Attorney, Agent, or Firm* — NK Patent Law

(57) ABSTRACT

A method of producing electrodes includes selecting a palladium alloy, annealing the palladium alloy at a first temperature above 350° C., cold working the palladium alloy into a desired electrode shape, and annealing the palladium alloy at a second temperatures and for a time sufficient to produce a grain size between about 5 microns and about 100 microns. The method further includes etching the palladium alloy, rinsing the palladium alloy with at least one of water and heavy water, and storing the palladium alloy in an inert environment.

12 Claims, 3 Drawing Sheets

US 11,563,217 B2

EXOTHERMICALLY RESPONSIVE CATHODES AND METHODS OF PRODUCTION THEREOF

CROSS-REFERENCE TO RELATED APPLICATION

This application is a continuation application of U.S. patent application Ser. No. 16/361,790, titled "EXOTHERMICALLY RESPONSIVE CATHODES AND METHODS OF PRODUCTION THEREOF," now U.S. Pat. No. 10,559,831, filed on Mar. 22, 2019 which is incorporated herein in its entirety by this reference.

BACKGROUND

Hydrogen absorption and storage within metallic structures is important for scientific studies, for fuel cell production, hydrogen storage, and for studies of heat production possibilities when deuterium isotopes are used. Currently, these studies and applications are performed with palladium as used directly from the manufacturer. Although many processes in producing palladium electrodes and those of other metals and alloys are known, there are no public disclosures that combine the processes to produce those with unique properties advantageous for hydrogen and deuterium absorption.

Further, there has been no reproducible and controlled method for creating palladium electrodes in absorption and heat studies. Often researchers and engineers encounter irreproducibility and inconsistent results in these studies because palladium as received from suppliers varies greatly from batch to batch. It is proposed that a standard palladium production method be established for thermal energy production methods and testing. Having a benchmark and standard electrode material with known history and known reliability is useful.

SUMMARY OF THE INVENTION

The present invention relates to the production of electrodes suitable for achieving rapid and high levels of hydrogen within following hydrogen loading. One of ordinary skill in the art will appreciate that references to hydrogen throughout the specification may refer to all stable isotopes of hydrogen including protium, deuterium, and/or tritium.

In one embodiment of the present invention, a method of producing electrodes may include selecting a palladium alloy, annealing the palladium alloy at a first temperature above 350° C., cold working the palladium alloy into a desired electrode shape, and annealing the palladium alloy at a second temperatures and for a time sufficient to produce a grain size between about 5 microns and about 100 microns. The method may further include etching the palladium alloy, rinsing the palladium alloy with at least one of water and heavy water, and storing the palladium alloy in an inert environment.

In another embodiment of the present invention, an electrode may be prepared by a process including selecting a palladium alloy, annealing the palladium alloy at a first temperature above 350° C., cold working the palladium alloy into a desired electrode shape, and annealing the palladium alloy at a second temperatures and for a time sufficient to produce a grain size between about 5 microns and about 100 microns. The method may further include etching the palladium alloy, rinsing the palladium alloy with at least one of water and heavy water, and storing the palladium alloy in an inert environment.

In yet another embodiment, the method may further include cleaning the palladium alloy with an organic solvent.

In yet another embodiment, the annealing may be performed at a temperature between about 800° C. and about 900° C.

In yet another embodiment, selecting the palladium alloy may include selecting a palladium alloy that exhibits volumetric expansion of no more than 12% on loading and absorption of hydrogen.

In yet another embodiment, the palladium alloy may comprise at least 60% palladium.

In yet another embodiment, the palladium alloy may comprise at least 90% palladium.

In yet another embodiment, the palladium alloy may further include at least one of rhodium and yttrium.

In yet another embodiment, the cold working may further include hammering and cold rolling.

In yet another embodiment, the grain size is between about 15 microns and about 40 microns.

In yet another embodiment, the etching may be performed with aqua regia.

In yet another embodiment, the inert environment may be a vacuum.

In yet another embodiment, the inert environment may be an inert gas.

DETAILED DESCRIPTION

In the following description, for the purposes of explanation, numerous specific details are set forth in order to provide a thorough understanding of the embodiments of the invention. One skilled in the art will recognize that the embodiments of the invention may be practiced without these specific details or with an equivalent arrangement. In other instances, well-known structures and devices are shown in block diagram form in order to avoid unnecessarily obscuring the embodiments of the invention.

The presently disclosed subject matter is presented with sufficient details to provide an understanding of one or more particular embodiments of broader inventive subject matters. The descriptions expound upon and exemplify particular features of those particular embodiments without limiting the inventive subject matters to the explicitly described embodiments and features. Considerations in view of these descriptions will likely give rise to additional and similar embodiments and features without departing from the scope of the presently disclosed subject matter.

Figure 1:
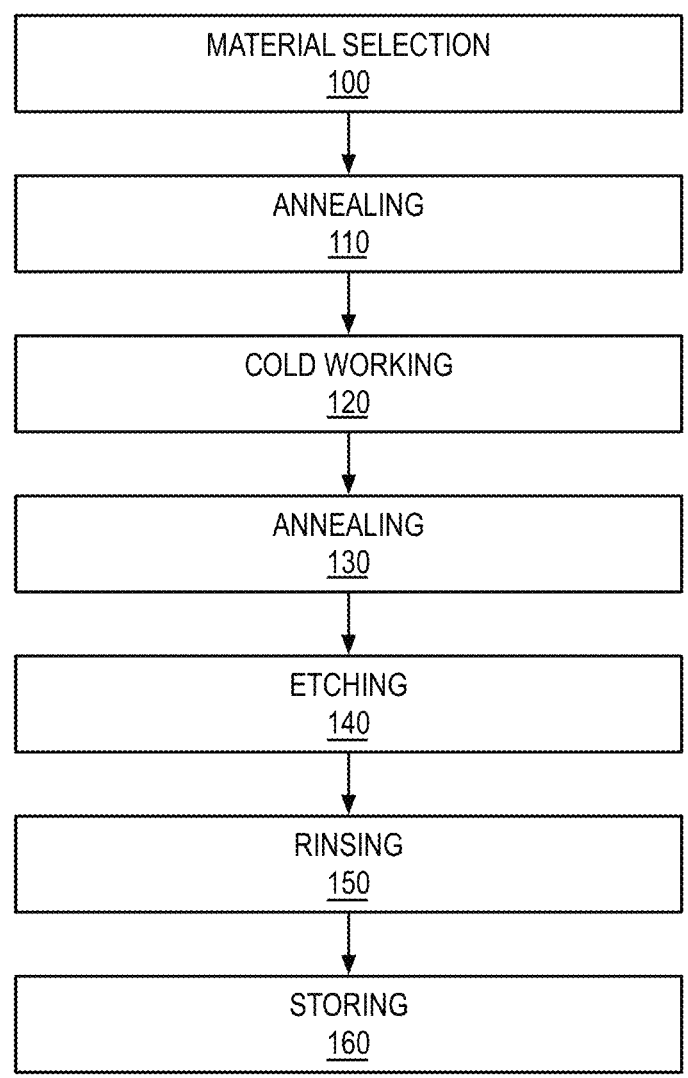
FIG. 1 is a flow diagram of a method for producing an electrode according to an embodiment of the present invention.

Referring now to FIG. 1, a method of producing electrodes may comprise selecting a palladium alloy 100, annealing the palladium alloy at a first temperature above 350° C. 110, cold working the palladium alloy into a desired electrode shape 120, and annealing the palladium alloy at a second temperatures and for a time sufficient to produce a grain size between about 5 microns and about 100 microns 130. The method may further comprise etching the palladium alloy 140, rinsing the palladium alloy with at least one of water and heavy water 150, and storing the palladium alloy in an inert environment 160.

Material Selection 100

Although other materials are often used by those skilled in the trade, it is preferred for heat production measurements to use palladium or its alloys. A limitation to the use of pure palladium for hydrogen diffusion, absorption, and especially heat production is a result of the pressure-concentration isotherms for the palladium-hydrogen system. At temperatures below 300° C. and pressures below 20 atm, increasing the hydrogen concentration leads to the formation of the β phase, which can coexist with the α phase. The β phase has a considerably expanded lattice compared to the α phase. For example, a hydrogen/palladium ratio of 0.5 results in an expansion of about 10% by volume. Nucleation and growth of the β phase in the α matrix therefore sets up severe strains in the material resulting in distortion, dislocation, multiplication, and hardening. After a few hydrogenation/dehydrogenation cycles, splitting of the diffusion membrane may occur. Accordingly, palladium alloys that limit the formation of the β phase during hydrogen loading are preferred.

Although pure palladium can be utilized, work hardening can reduce the expansion, and the use of alloying with other metals is beneficial in cases where heat production is desired. It is found that expansion during electrochemical loading of hydrogen into palladium in excess of 10-20% seldom produces systems with anomalous heat production. The preferred palladium alloy is 90% palladium, 9% rhodium, and 1% yttrium (atomic percentages). Other desirable alloys include palladium with 10% rhodium; palladium with 1-15% yttrium; palladium with 20-26% silver; palladium with 40% copper; palladium with 1.5% boron; palladium with 5-20% gold; palladium with 5-15% cerium; 79% palladium, 20% silver, and 1% rhodium. The goal is to select alloys which suppress the α-β phase transition during loading with hydrogen in its various isotopic forms. Tertiary additions of rhodium to the alloy mixtures often increases the stability of the metal structures and limits volume expansions due to phase changes. Another goal is to select alloys with a permeability that allows a higher diffusion rate for hydrogen than pure palladium. Preferably, the palladium alloy exhibits volumetric expansion of no more than 12% upon loading and absorption of hydrogen.

Annealing 110

Annealing helps make the sample more ductile and more malleable for the cold working step. The annealing also promotes crystal grain growth and conditions and purifies the sample from volatile contamination. For example, if the sample has been allowed to absorb hydrogen during storage or delivery, it may be harder than the pure palladium or palladium alloy. Annealing helps to remove contaminants such as hydrogen and form a desirable crystal structure. Annealing should be conducted at temperatures above 350° C. where most of the palladium alloys may have phase changes. Preferably, the annealing may be conducted at temperatures between about 700° C. and 1000° C. More preferably, annealing may be conducted at temperatures between about 800° C. and 900° C. It is also recommended that the annealing be done for at least 30 minutes.

Cold Working 120

Cold working the sample often helps realign crystal orientations and remove voids within the sample. Many methods of cold working metal samples into the desired shapes and sizes are known to those skilled in the art. Hammering and cold rolling are normally employed in the production of electrodes. It is preferred that cold rolling be conducted when foil, sheet, wire, or rod shapes are desired. In the case of foils, it is also preferred that the sample be rotated by 120 degrees (about the normal to the surface) between consecutive rollings.

It is also preferred that the surfaces of the machines and tools used during cold working be clean and free from oils and other foreign particles. Although the rollers may be comprised of any suitable material, in one embodiment, the cold rollers may be plated with nickel or palladium to avoid contamination of the sample with other materials.

Annealing 130

After the cold working step, the palladium alloy may be annealed again to produce crystal grains in the desired size. Preferably, the surface of the palladium alloy may be occupied by grains between about 5 microns and about 100 microns. More preferably, the grains may be between about 15 microns and about 40 microns.

Different lots of the same samples may have greatly varying properties even though the samples may be alloys with nominally identical ratios of palladium to other metals. The vary properties will require different temperatures and times during the annealing step to produce the desired grain size. Although there is no standardized protocol for producing a desired grain size across all samples and lots, one of ordinary skill in the art may achieve desired grain sizes through minimal experimentation.

To identify the second temperature and time sufficient to produce a desired grain size, a small aliquot of the sample may be annealed for a short time and its grain size may be monitored afterwards. If the grain sizes of the aliquot are much smaller than about 20 microns, it may be re-annealed for an additional time to increase grain size. This timing may then be used for samples from the same supplier and lot. In the initial test of aliquots, it is preferred to anneal for only short periods of time—for example, less than 15 minutes— and for lower temperatures—for example, less than 700° C.—since higher temperatures and longer times increase grain sizes. Thus, in testing aliquots of new material it is preferable to start with lower temperatures and shorter times to allow for re-annealing of samples at higher temperatures and longer times until the desired grain size is achieved. The second temperature and time sufficient to achieve desired grain size are dependent on the exact alloy ratios and any cold working and extruding history of the samples. Increasing the annealing temperature above 900° C. often increases the grain size and should be avoided unless there are special reasons for obtaining larger grain sizes.

Etching 140

Etching increases the effective surface area and helps present selected grains and crystal orientations to the solution. There are many etching methods known to those skilled in the art. These include treatment with nitric acid, aqua regia, sulfuric/glycerin, formic and other acidic treatments, and the use of running the electrode as an anode. Etching with aqua regia increases the capacitance of the double layer and increases the effective surface area resulting in faster loading and most often an increase in the loading ratios.

In one embodiment, an alloy comprising 95% palladium 5% rhodium was etched for 3 minutes in aqua regia at 25° C. In another embodiment, a pure palladium sample was etched by running it as an anode for 30 minutes in 1N formic acid. When etched with aqua regia, 1-5 minutes is generally sufficient.

Rinsing 150 and Storage 160

Immediately following etching, the sample may be rinsed with water or heavy water and stored in vacuum or an inert atmosphere. The inert atmosphere may include inert gases such as nitrogen or noble gases. Proper storage in vacuum or an inert atmosphere ensures the processed samples exhibit consistent loading and exothermic characteristics during hydrogen loading.

Figure 2:
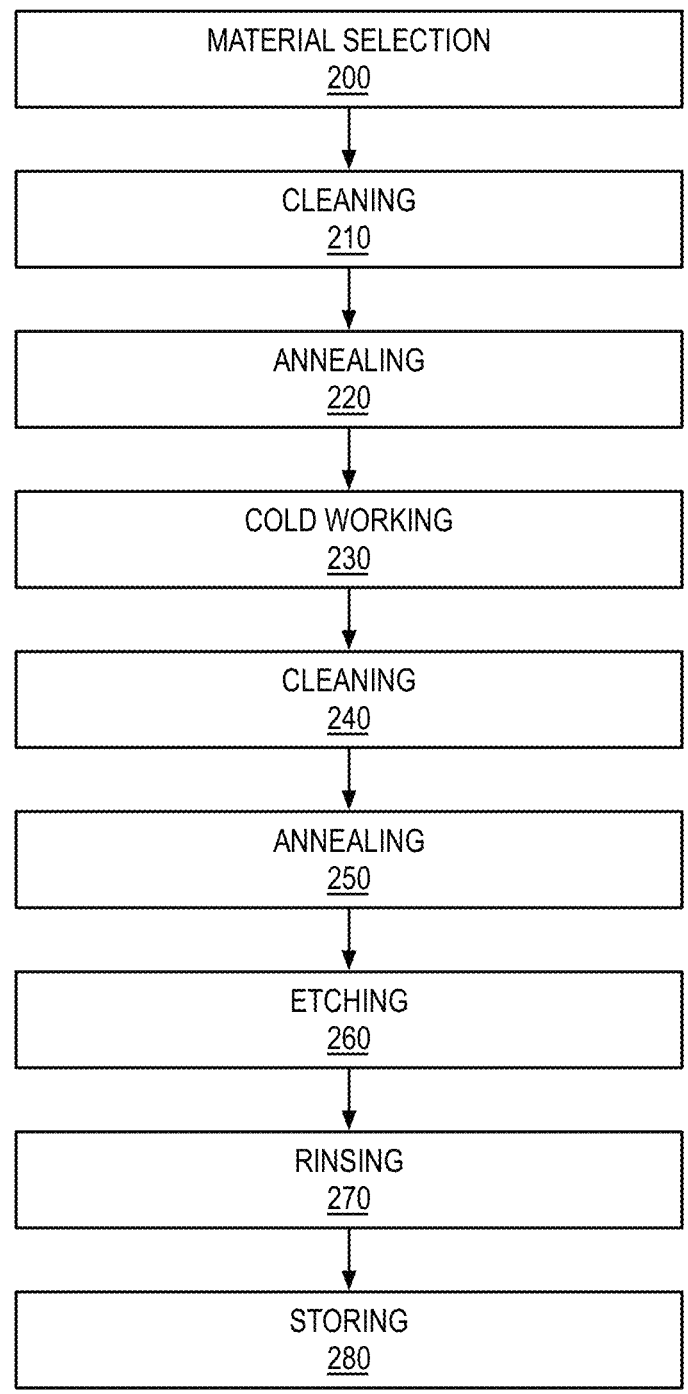
FIG. 2 is a flow diagram of a method for producing an electrode according to an embodiment of the present invention.

Referring to FIG. 2, the method may further comprise cleaning the palladium alloy with an organic solvent 210, 240. It is preferred to clean the palladium alloy before each annealing step to remove any surface contamination resulting from cold working. Cleaning with an organic solvent such as acetone followed by rinsing by deionized water is preferred.

Figure 3:
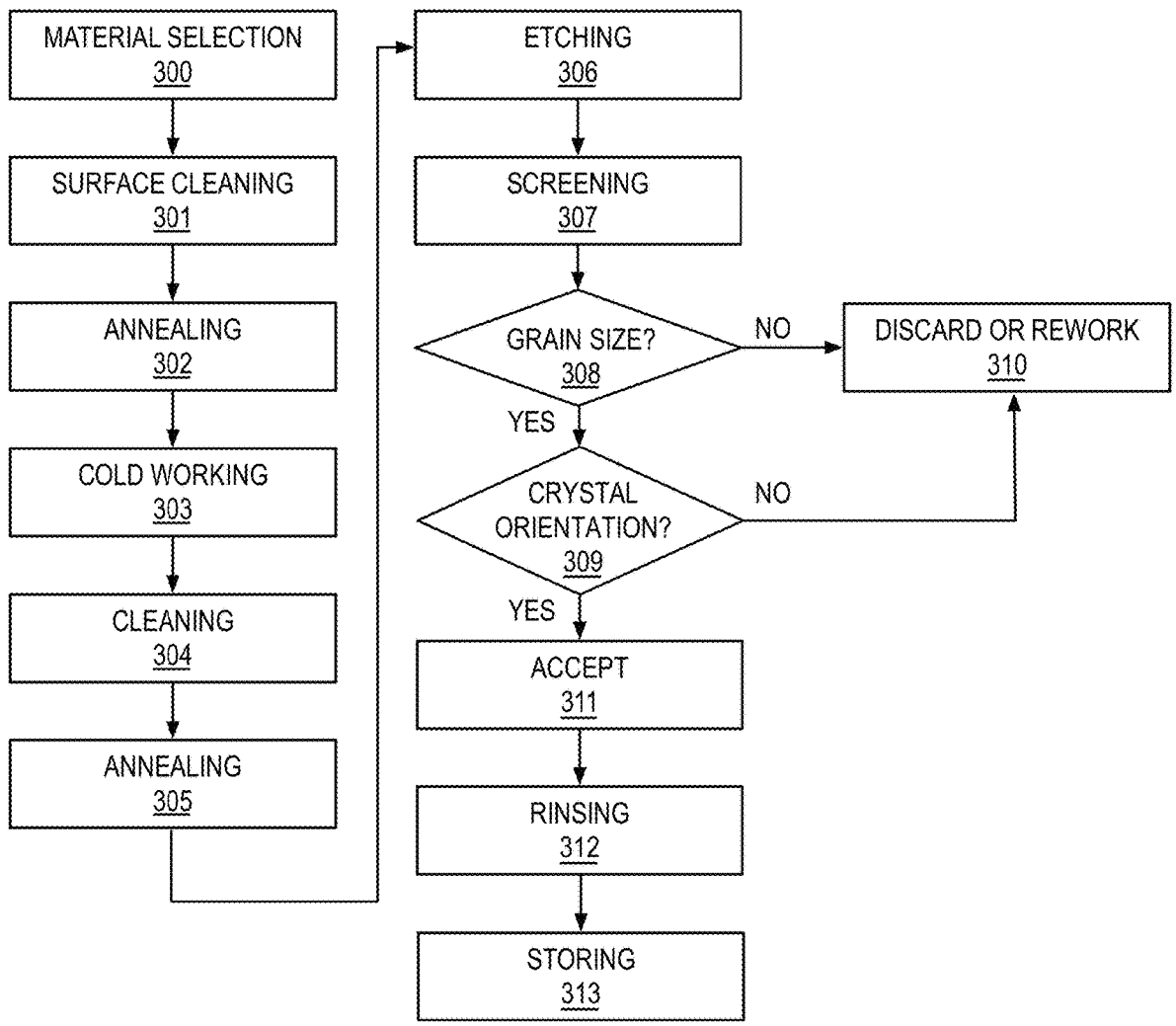
FIG. 3 is a flow diagram of a method for producing an electrode according to an embodiment of the present invention.

Referring to FIG. 3, a goal of the electrode production protocol is to produce an electrode with the desired grain size, crystal orientation presented to the electrolyte, and hydrogen absorption and loading characteristics. Accordingly, the method may further include screening the sample 307 prior to rinsing 312 and storing 313. Generally, electrodes with the desired properties exhibit grain sizes between about 5 microns and about 100 microns, with the preponderance of the grain sizes in the range of about 20 microns to about 40 microns. Preferably, after the etching step, the palladium alloy is examined to determine if the grain size falls within the desired range 308. Palladium alloy samples which fail to meet the criteria may be discarded or reprocessed 310. For samples with grain sizes that are too small, re-annealing the palladium alloy will often increase grain size to the desired range. The preferred grain size criteria for thermal production upon loading with hydrogen is that the preponderance of surface grains be near 35 microns.

Although not as critical grain size, the crystal orientation of the material is also a variable in the production of thermal energy of palladium based electrodes in many configuration. After screening for grain size, the sample may also be screened for crystal orientation 309. A preponderance of crystal orientations at the surface is beneficial to observing the anomalous thermal effects often associated with loading hydrogen into palladium based electrodes. Crystal orientations as used herein is in reference to the standard Miller index as used in the art of metallurgy.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example reference to "an additive" can include a plurality of such additives, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments, +/−10%, in some embodiments +/−5%, in some embodiments +/−1%, in some embodiments +/−0.5%, and in some embodiments, +/−0.1%, from the specified amount, as such variations are appropriate in the disclosed products and methods.

What is claimed is:

1. A method of producing electrical contacts comprising:
   selecting an alloy;
   annealing the alloy at a first predetermined temperature;
   forming the alloy into a desired electrical contact shape;
   annealing the alloy at a second temperature and for a time sufficient to produce grains;
   etching the alloy; and
   storing the alloy in an inert environment.

2. The method of claim 1 further comprising cleaning the alloy with an organic solvent.

3. The method of claim 1, wherein the annealing is performed at a temperature between about 800° C. and about 900° C.

4. The method of claim 1, wherein the alloy exhibits volumetric expansion.

5. The method of claim 1, wherein the alloy comprises at least 60% palladium.

6. The method of claim 1, wherein the alloy comprises at least 90% palladium.

7. The method of claim 1, wherein the alloy further comprises at least one of rhodium and yttrium.

8. The method of claim 1, wherein the forming comprises hammering and cold rolling.

9. The method of claim 1, wherein the grain size is between about 15 microns and about 40 microns.

10. The method of claim 1, wherein the etching is performed with aqua regia.

11. The method of claim 1, wherein the inert environment is a vacuum.

12. The method of claim 1, wherein the inert environment is an inert gas.

* * * * *